United States Patent [19]

De Bretagne

[11] 3,746,893

[45] July 17, 1973

[54] FIELD EFFECT TRANSISTOR IMPEDANCE COUPLING NETWORK WHOSE OUTPUT VOLTAGE EQUALS THE INPUT VOLTAGE

[75] Inventor: Yves De Bretagne, Minneapolis, Minn.

[73] Assignee: Honeywell Inc., Minneapolis, Minn.

[22] Filed: July 29, 1971

[21] Appl. No.: 167,520

Related U.S. Application Data

[63] Continuation of Ser. No. 807,687, March 17, 1969, abandoned.

[52] U.S. Cl. .................... 307/304, 330/38, 307/230, 307/237

[51] Int. Cl. .............................................. H03f 3/04

[58] Field of Search .................... 307/246, 279, 251, 307/304, 230, 237; 330/38 FE

[56] References Cited

UNITED STATES PATENTS

| | | | |
|---|---|---|---|
| 3,286,189 | 11/1966 | Mitchell et al. | 330/38 FE U |
| 3,365,586 | 1/1968 | Billings | 307/279 X |
| 3,384,792 | 5/1968 | Kazan et al. | 307/304 X |
| 3,386,053 | 5/1968 | Priddy | 307/304 X |
| 3,436,672 | 4/1969 | Delagrange | 307/304 X |

OTHER PUBLICATIONS

Electronics June, 29, 1964 "High Gain Amp" p–53 by Murphree et al.

*Primary Examiner*—John S. Heyman
*Attorney*—Trevor B. Joike

[57] ABSTRACT

A field effect transistor impedance coupling circuit having two series connected field effect transistors. The source of the first transistor is connected to the drain of the second transistor through a resistor. The gate of the first transistor is the input. The drain of the second transistor is the output. The second transistor is connected as a constant current source, and the resistance value of the resistor is selected so that the output voltage equals the input voltage.

1 Claim, 1 Drawing Figure

Patented July 17, 1973 3,746,893
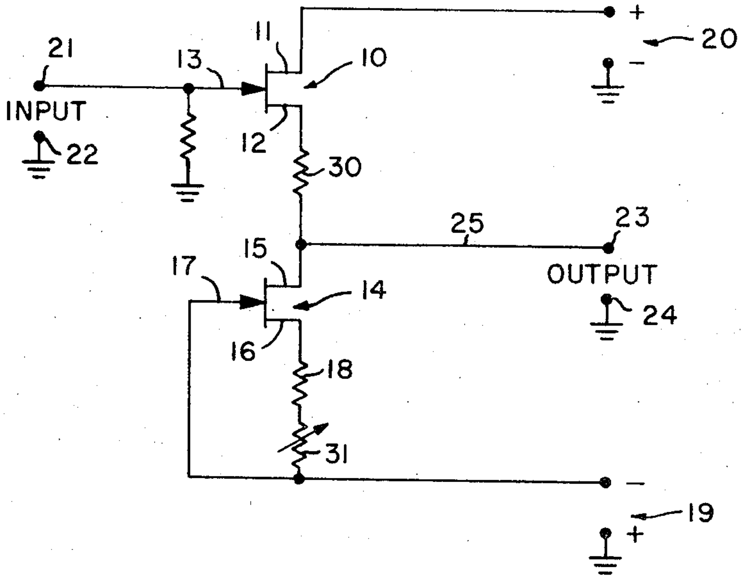
*INVENTOR.*
YVES de BRETAGNE
*BY* [signature]
*ATTORNEY.*

FIELD EFFECT TRANSISTOR IMPEDANCE COUPLING NETWORK WHOSE OUTPUT VOLTAGE EQUALS THE INPUT VOLTAGE

SUMMARY OF THE INVENTION

The invention consists of a known field effect transistor circuit having two field effect transistors, one transistor being connected as a constant current source for the other transistor, to which is added resistance means of a critical resistance value, with the resulting new and unusual effect that the output voltage is made equal to the input voltage.

BRIEF DESCRIPTION OF THE DRAWING

The single FIGURE is a schematic showing of the invention.

DESCRIPTION OF THE PREFERRED EMBODIMENT

Referring to the single FIGURE, field effect transistor 10 includes a drain electrode 11, a source electrode 12 and a gate electrode 13. Field effect transistor 14 includes a drain electrode 15, a source electrode 16 and a gate electrode 17.

Transistor 14 has its source electrode 16 connected to gate electrode 17 through resistor 18 and adjustable resistor 31. Transistor 14 is connected as a constant current source for transistor 10. Source 16 is connected through resistor 18 to direct current supply 19, for example, 10 volts. The positive terminal of supply 19 is connected to ground or reference potential. Drain electrode 11 of transistor 10 is connected to direct current supply 20, for example, 10 volts. The negative terminal of supply 20 is connected to reference potential.

Gate electrode 13 of transistor 10 is connected to input means, terminals 21 and 22. Terminal 22 is connected to reference potential. Input means 21, 22 is adapted to receive alternating current or direct current input voltage.

Terminals 23 and 24 constitute an output means. Terminal 24 is connected to reference potential. The output which exists at output means 23, 24 is an alternating current or direct current voltage, in accordance with an alternating current or direct current voltage input. Conductor 25 connects terminal 23 to drain electrode 15.

The above described structure is a known field effect transistor circuit having two transistors, one of which is connected as a constant current source for the other. With the circuit as thus far described, the input voltage and the output voltage are related, but they are not equal being offset by a gate-to-source voltage.

The invention utilizes a resistor 30 which is connected as a portion of the series source-to-drain circuit connecting source 12 to drain 15. The resistance value of resistor 30 is critical and is selected such that with a given input voltage at input means 21, 22, the voltage existing across resistor 30, from source 12 to drain 15, is equal in magnitude and opposite in polarity to the voltage existing from gate 13 to source 12. With this critical condition satisfied, the output voltage 22, 23 is made equal to the input voltage 21, 22.

Transistors 10 and 14 may be a matched pair, whose electrical characteristics are substantially identical, whereupon resistor 30 is selected to be equal to the sum of the resistance value of resistors 18 and 31. Mismatch of the transistors is corrected by adjustment of resistor 31. To adjust resistor 31, terminal 21 is first connected to terminal 22. The voltage at terminal 23 is then measured with respect to reference potential, and resistor 31 is adjusted to reduce this voltage to zero. The connection from terminal 21 to terminal 22 is then removed. Thereafter, within the operating voltage range of the structure, the output voltage at terminal 23 remains equal to the input voltage at terminal 21.

The embodiment of the invention in which an exclusive property or right is claimed are defined as follows:

1. In an impedance coupling network for eliminating the offset between input and output voltages, the network comprising:

first and second junction field effect transistors, each having gate, source and drain electrodes and being subject to an offset voltage between gate and source electrodes;

signal input means connected to the gate electrode of said first transistor;

positive and negative power input terminals and a common terminal, said power input terminals adapted to be energized from an electrical source which is positive and negative with respect to said common terminal;

a series circuit connected from one of said terminals to the other of said terminals comprising in series the drain to source of said first transistor, offset resistive means, the drain to source of said second transistor, and further resistive means, said offset resistive means having such a value as to develop a voltage thereacross to nullify the first transistor offset voltage;

a signal output terminal conductively connected to said second transistor drain electrode; and conductive means connecting the gate of said second transistor to said negative power input terminal wherein said second transistor and further resistive means operates as a constant current source for said first transistor.

* * * * *